A. MECHAM.
GANG PLOW.
APPLICATION FILED OCT. 10, 1908.

918,182.

Patented Apr. 13, 1909.
2 SHEETS—SHEET 2.

WITNESSES
Geo. W. Naylor
Wm. P. Patton

INVENTOR
Adelbert Mecham
BY Munn & Co.
ATTORNEYS

UNITED STATES PATENT OFFICE.

ADELBERT MECHAM, OF EDINBURG, NORTH DAKOTA.

GANG-PLOW.

No. 918,182.  Specification of Letters Patent.  Patented April 13, 1909.

Application filed October 10, 1908. Serial No. 457,037.

*To all whom it may concern:*

Be it known that I, ADELBERT MECHAM, a citizen of the United States, and a resident of Edinburg, in the county of Walsh and State of North Dakota, have invented a new and Improved Gang-Plow, of which the following is a full, clear, and exact description.

This invention relates to gang plows that are progressively moved by applied power, and has for its object to provide novel details of construction for a gang plow, which adapt the series of individual plows forming a gang and that are arranged laterally in sequence, to automatically adjust themselves so as to conform with the undulations of the soil that is being plowed; and a further object is to so construct the attachment between each individual plow beam and the main frame beam, that said connection will be caused to automatically release a plow that is held from progress by an obstruction in or on the soil that is traversed by the gang plow.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1:
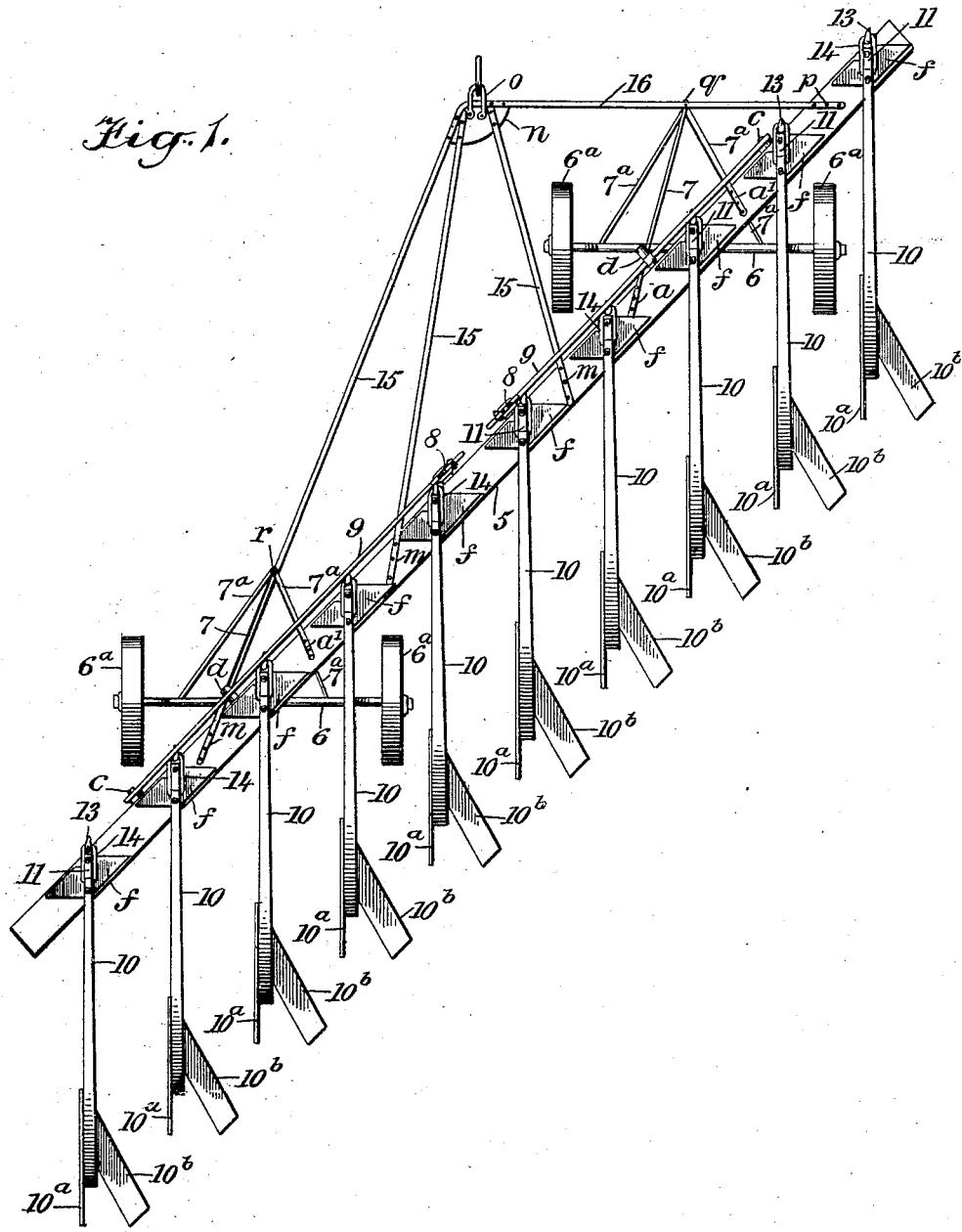
Figure 2:
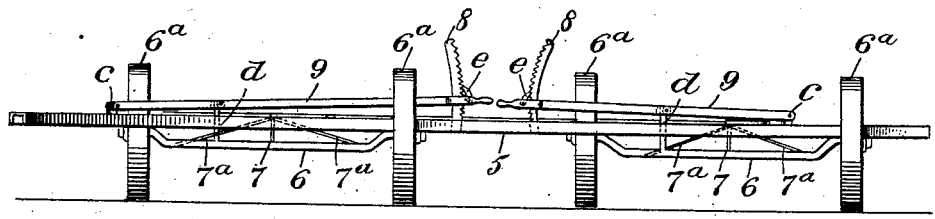
Figure 3:
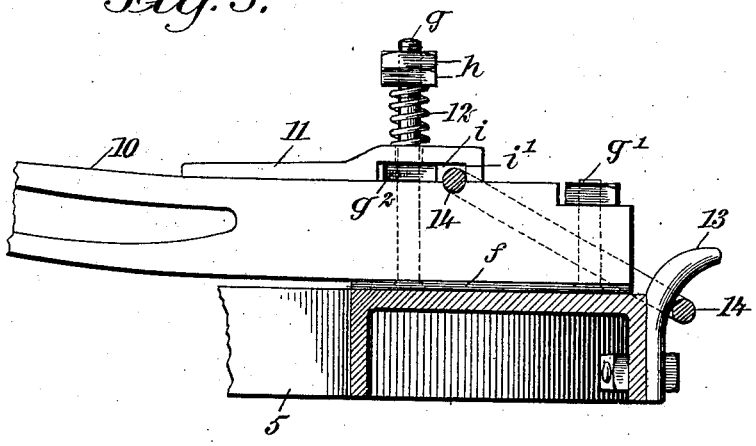

Figure 1 is a plan view of the improved gang plow; Fig. 2 is an enlarged detached view of wheeled frame supports, a main frame beam, and adjusting means for changing the elevation of said beam with relation to the ground; and Fig. 3 is an enlarged partly sectional side view of an end portion of the main frame beam, an end portion of an individual plow beam seated and secured on the main frame beam, and novel means for automatically detaching the individual plow beam from the main frame beam.

In the drawings, 5 represents the main frame beam, which serves to support and space apart the individual beams for a gang of similar plows that are arranged laterally and rearward of the main frame beam, as will be hereinafter fully set forth. The beam 5 may be formed of a hard wooden plank faced with plate metal, but as shown, is preferably constructed in the form of a recessed bar, that may be of iron or steel, having suitable dimensions for effective service, and strength to resist strains. Two trucks are provided for the support of the beam 5, at a proper distance above the ground, each truck comprising a bent axle 6, and a pair of traction wheels $6^a$ rotatably mounted upon the respective ends of the axle. The trucks are suitably spaced apart and secured upon the main frame beam 5, preferably at an equal distance from the ends thereof.

The means for attaching an axle 6 to the main frame beam 5, as shown, consists of a center brace 7, and two side braces $7^a$. The side braces for each axle are joined at their upper ends upon the upper end of a respective center brace 7, and diverge therefrom, extending toward opposite ends of a corresponding axle body. One brace 7 for each truck is firmly secured upon the axle body as shown at $a$, and the complementary brace $7^a$ which trends oppositely, has a lapped and secured engagement with the main frame beam 5 as appears at $a'$, and thence passes through the beam, the extended end thereof being attached to the bent body of a respective axle 6. The axles are so arranged and secured to the main frame beam by the braces $7^a$, that their bent portions are disposed below the plane of the spindles on their ends which engage the traction wheels $6^a$ and also below the main frame beam 5, as shown in Fig. 2.

Two sectors 8, 8 are details of the improvement, these similar sectors having their convex edges furnished with teeth. The sectors are erected upon the main frame beam 5 near each other, and at an equal distance from the center of said beam, the toothed convex edges of the sectors facing each other. Two adjusting levers 9, 9 are employed which at respective ends are pivoted upon the main frame beam 5 as shown at $c$ and thence project toward each other.

Near the longitudinal center of each lever 9, a post $d$ is upwardly projected from a respective axle 6, and upon the upper end of each post one of the levers is pivoted. Near the free end of each lever 9, a slot opening is formed therein, through which is inserted a respective sector 8, and adjacent to each sector a pawl $e$ is pivoted on the lever through which said sector is inserted and engages between the teeth of the latter. It will be seen that by the adjustment of the levers 9, at their ends which engage the sectors 8, the opposite ends of said levers will be correspondingly raised or lowered, which will elevate or depress the end portions of the main frame 5.

The individual beams 10 of a series of plows have their front ends disposed on the main frame beam 5, at equal distances apart, and are thereto detachably secured as will be hereinafter explained.

The gang of individual plows are of similar construction, and may be of any preferred style that is best adapted for effective service. In the drawings, $10^a$ represents the similar standards for the plurality of plows, each standard projecting down of a suitable length from a respective beam 10, and $10^b$ indicates the complementary mold board or share for respective plows, and which in use turns the soil in a furrow in the usual manner.

The forward end of each plow beam 10 extends over the main frame beam 5, and laps upon an intervening washer plate $f$ which is secured on the upper side of a respective beam 10, by bolts $g$, $g'$, as is indicated by dotted lines in Fig. 3. Upon the upper surface of each plow beam 10, near the forward end thereof, a keeper plate 11 is mounted, these similar keeper plates each having a recess $i$ in the lower side near the front end thereof, which receives a binding nut $g^2$ that is screwed upon the bolt $g$ and serves with said bolt as a means for securing the rear end of a respective washer plate $f$ upon the engaged plow beam 10.

The keeper plate 11 for each plow beam 10 is yieldingly secured thereupon by means of a coiled spring 12, that is mounted upon the upwardly extended portion of the screw $g$ which passes through said keeper plate, and above said spring on the bolt two jam nuts $h$ are mounted, which by adjustment regulate the resilient pressure of the spring 12, upon the keeper plate 11.

A plurality of bracket arms 13, are secured upon the front edge of the main frame beam 5, and spaced apart a distance equal to that which separates the plow beams 10 from each other at their forward ends, these similar arms curving forwardly and upwardly as shown for one arm in Fig. 3.

In the forward portion of the recess $i$, that is formed in each keeper plate 11, one looped end of a coupling link 14, is removably secured by its loose engagement with the hook-like forward end $i'$ of said keeper plate, and as shown in Fig. 3, said link inclines forward and downward, and at its front looped end is hooked upon a respective curved arm 13 opposite which it is disposed.

On the main frame beam 5, at suitable points of separation, the rear ends of three draft rods 15, are secured, as shown at $m$ in Fig. 1, these rods converging forwardly, and at their front ends are secured upon a coupling plate $n$ upon which a clevis ring $o$ is loosely secured. A fourth rod 16, is attached by one end as at $p$ upon the forward end portion of the main frame beam 5, and thence is extended toward the coupling plate $n$ whereon said extended end is secured, this rod or bar serving as a lateral brace for the draft rods 15.

The converging ends of the braces 7, $7^a$ on the front axle 6, are secured at $q$ upon the brace bar 16, whereby they are maintained upright. In a like manner, the rear braces 7, $7^a$ are lapped upon and secured to the outer draft rod 15 at their forward ends, as shown at $r$ in Fig. 1.

The completed gang plow may be coupled to a source of power and progressive movement, such as a plurality of draft animals or a traction engine, by a loose connection of such draft power with the clevis ring $o$.

It will be seen that the main frame beam 5, may be permitted sufficient movement to yield and conform to the undulations of the soil over which the machine is drawn, which action may be facilitated by a proper adjustment of the levers 9.

If any one of the individual plows should strike against an obstruction, and be arrested, the link 14 that couples this plow with the main frame beam 5, will be pulled from its hooked engagement with the corresponding keeper plate 11, due to the yielding of the spring 12, which will detach the individual plow from the beam 5. If the detached plow is an intermediate one, that should be replaced in order to properly plow the soil, and if the detached plow is rendered unserviceable, one of the plows at an end of the main frame beam 5, may be detached from its normal position, and be substituted for the injured one, thus enabling a continuation of the plowing operation.

It is claimed for this improved gang plow, that it is light, strong and durable, is adapted for speedy adjustment to enable the conformation of the several individual plows with undulations of the soil, that it will plow the ground evenly at an equal depth, and enable the substitution of an uninjured plow for a broken one when this is necessary for a continuation of the plowing operation.

Having thus described my invention, I claim as new and desire to secure by Letters Patent:

1. In a gang plow of the character described, the detachable connection between the main frame beam and one of a plurality of individual plow beams, comprising a bent arm on the main frame beam, an individual plow beam seated at one end thereof on the main frame beam, a spring-pressed keeper plate on the individual plow beam, and a coupling link having hooked engagement at its ends respectively upon an end of the keeper plate and upon the bent arm.

2. In a gang plow, a main beam, a plurality of plows, and means for connecting the plows to the beam, each of said means comprising an arm on the main beam, a spring pressed keeper plate on the plow beam and a coupling link engaging the arm and the keeper plate respectively.

3. In a gang plow, a main beam, a plurality of plow beams, and means for detachably connecting each of said means to the beam, each of said means comprising an arm on the beam, a keeper plate, a bolt traversing the plow beam and the keeper plate, a spring on the bolt engaging the keeper plate, a nut threaded on the bolt against which the spring rests, and a link connecting the keeper plate with the arm.

4. In a gang plow, the combination with a resilient main frame beam, a plurality of individual plows, the beams of which lap at the forward ends on the main frame beam, and means for releasably securing the plow beams on the main frame beam, of trucks that support the main frame beam, each truck comprising a bent axle and traction wheels thereon, braces fixed at like ends on each bent axle, draft rods attached at one end thereof upon the main frame beam and converged at their opposite ends, which are secured upon a coupling plate, and a brace bar extended between the main frame beam and the coupling plate, the converged ends of the braces on the front axle being secured on said brace bar, and the converged ends of the braces on the rear axle being attached to one of the draft rods.

In testimony whereof I have signed my name to this specification in the presence of two subscribing witnesses.

ADELBERT MECHAM.

Witnesses:
    PAT. PAUL,
    C. BUCK.